United States Patent Office 3,752,862
Patented Aug. 14, 1973

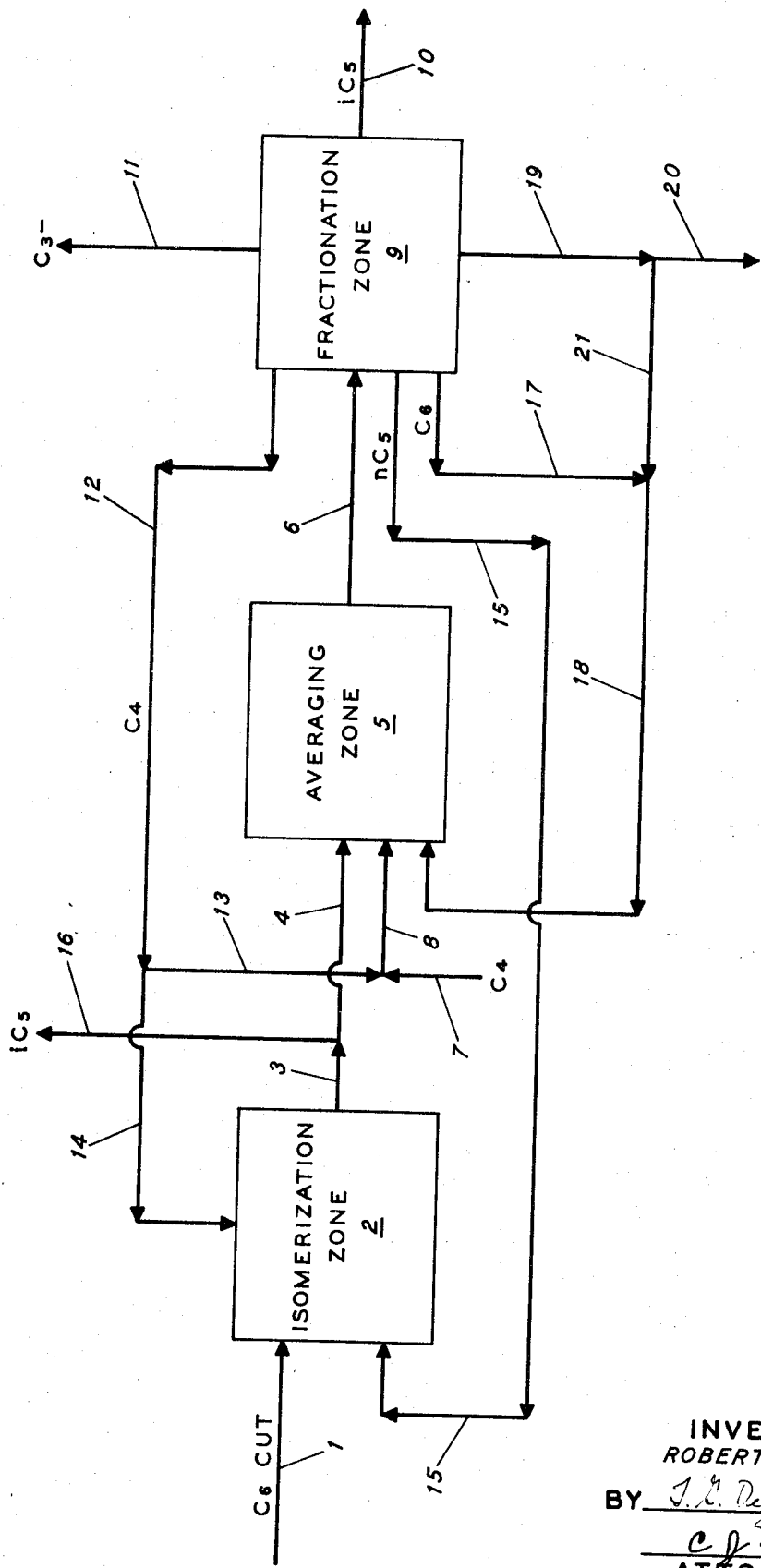

3,752,862
PROCESS FOR CONVERTING BUTANE AND HEXANE INTO ISOPENTANE BY AVERAGING AND ISOMERIZATION
Robert P. Sieg, Piedmont, Calif., assignor to Chevron Research Company, San Francisco, Calif.
Filed Oct. 15, 1970, Ser. No. 80,857
Int. Cl. C07c 9/00
U.S. Cl. 260—676 R     8 Claims

ABSTRACT OF THE DISCLOSURE

A process for converting butane and hexane into isopentane which comprises: (a) averaging a $C_6$ rich hydrocarbon stream containing less than 1 p.p.m. sulfur with butane in an averaging zone by contacting the $C_6$ and butane hydrocarbons with an averaging catalyst having a component which has catalytic activity for alkane dehydrogenation and a component which has catalytic activity for olefin averaging to obtain an $nC_5$ rich averaging effluent stream, and (b) isomerizing at least a portion of the $nC_5$ in the averaging effluent stream in an isomerization zone by contacting the $nC_5$ with an isomerization catalyst at a hydrogen partial pressure between 10 p.s.i.g. and 3,000 p.s.i.g. and a temperature between 100° F. and 900° F. to obtain an $iC_5$ rich stream.

BACKGROUND OF THE INVENTION

The present invention relates to a combination process involving isomerization of saturated hydrocarbons. More particularly, the present invention relates to isomerization operated in combination with saturated hydrocarbon averaging, and preferably with integrated common fractionation facilities.

Isomerization is a well-known and frequently used step in petroleum refining. It enables the adjustment of the octane number upwards by converting normal paraffins, such as normal hexane, to isoparaffins, such as 2,2-dimethylbutane. A blend of various isomeric paraffinis provides a gasoline which has a higher octane number than a gasoline consisting of normal paraffins. Isomerization is generally performed by passing isomerizable hydrocarbons together with hydrogen through a reaction zone containing an isomerization catalyst. The hydrogen to hydrocarbon mol ratio varies within a wide range, generally from 0.05:1 to 5:1, preferably within the range of about 0.5:1 to 2:1 for pentanes and hexanes and 0.1:1 to 1:1 for butanes. The reaction temperature will depend upon the specific hydrocarbons being isomerized and the nature and type of catalyst employed. Hydrocarbon streams consisting chiefly of pentanes and hexanes are usually isomerized at temperatures within the range of 200–900° F. The isomerization, normally effected under pressure, may be carried out in the liquid or vapor phase. Generally, pressures within the range of 300–1,000 p.s.i.g. have been used. A liquid hourly space velocity (LHSV), that is, the volume of liquid charged per hour per volume of catalyst, within the range of 0.5 to 10.0 and preferably within the range of about 0.75 to 4.0 is employed.

Various catalysts have been suggested for use in isomerization processes. In general, the isomerization can be effected at low temperatures (ca. 300° F.) with a Friedel-Crafts catalyst, such as aluminum chloride, or at high temperatures (ca. 750° F.) with a supported metal catalyst, such as platinum on halogenated alumina or silica-alumina. Thermodynamic equilibrium for isoparaffins is more favorable at low temperatures; however, the low temperature process has not received wide application because the Friedel-Crafts catalyst is quite corrosive and therefore expensive metals or alloys must be used. Of the high temperature isomerization processes, the noble metal catalysts such as platinum or palladium are perhaps considered to be the most effective.

Recently, catalysts comprising either natural or synthetic crystalline aluminosilicates have been suggested for isomerization processes. Included among the crystalline alumino-silicates which have been suggested are the type X and type Y silicates, mordenite, and layered aluminosilicates such as described in Granquist U.S. Pat. 3,252,757.

U.S. Pat. 3,507,931, titled "Isomerization of Paraffinic Hydrocarbons in the Presence of a Mordenite Catalyst" discloses the isomerization of straight run distillates rich in $C_4$–$C_6$ normal paraffins using a catalyst having a high silica to alumina ratio, preferably above 20:1, and operating the isomerization reaction at relatively low temperatures, such as 250–400° F.

U.S. Pats. 3,280,212 and 3,301,917 also disclose hydro-isomerization processes using crystalline aluminosilicate type catalysts.

As indicated above, the present invention is directed to a combination process involving isomerization and averaging. The term "averaging" is used in this specification to mean conversion of feed components or hydrocarbon molecules of different molecular weight to components of intermediate molecular weight relative to the feed components. For example, in an averaging reaction between butane and hexane, the butane and hexane are converted to pentane.

Averaging of saturated hydrocarbons or paraffinic hydrocarbons to form hydrocarbons of intermediate molecular weight has been carried out according to prior art, using acidic catalysts, such as boron fluoride-hydrogen fluoride catalyst. For example, U.S. Pat. 2,216,274 discloses a process for interacting relatively high molecular weight paraffin hydrocarbons with lower molecular weight isoparaffin hydrocarbons to form paraffin hydrocarbons of intermediate molecular weight by contacting the feed hydrocarbons with a catalytic material consisting essentially of boron fluoride and hydrogen fluoride at temperatures between about −30° and +150° C.

A number of other patents disclose paraffin averaging reactions using a catalyst comprised essentially of boron fluoride and hydrogen fluoride or boron fluoride, hydrogen fluoride and water. These patents include U.S. Pats. 2,296,371, 2,405,993, 2,405,994, 2,405,995, 2,405,996 and 2,405,997.

Particularly advantageous averaging reaction conditions for use in the averaging step of the present invention are disclosed in patent applications Ser. Nos. 864,870 now abandoned and 864,871, which applications have the same assignee as the present application.

SUMMARY OF THE INVENTION

According to the present invention, a process is provided for converting butane and hexane into isopentane which comprises: (a) averaging a $C_6$ rich hydrocarbon stream containing less than 1 p.p.m. sulfur with butane in an averaging zone by contacting the $C_6$ and butane hydrocarbons with an averaging catalyst having a component which has catalytic activity for alkane dehydrogenation and a component which has catalytic activity for olefin averaging to obtain an $nC_5$ rich averaging effluent stream, and (b) isomerizing at least a portion of the $nC_5$ in the averaging effluent stream in an isomerization zone by contacting the $nC_5$ hydrocarbon with an isomerization catalyst at a hydrogen partial pressure between 10 p.s.i.g. and 3,000 p.s.i.g. and a temperature between 100° F. and 900° F. to obtain an $iC_5$-rich stream.

The process of the present invention results in the production of high octane isopentane from low octane hexane (such as normal hexane, which has an octane rating of about 26) and butane which are often currently present in excess amounts in refinery plants. Butanes have become increasingly available as refinery plants have been modernized to include hydrocracking units producing substantial amounts of butanes, and as lower vapor pressures have been required for gasolines necessitating the use of less of the relatively volatile butanes in gasolines. The isopentane which is produced in the process of the present invention has an octane rating of about 92 and is particularly useful in high octane unleaded or low lead content gasolines.

Isomerization of $C_6$ hydrocarbons can be used to upgrade the octane rating of normal hexane-rich hydrocarbon fractions. However, the octane can be increased only to about 70–75 (motor octane) by isomerization because the main hexane isomers produced, namely, 2-methylpentane and 3-methylpentane, have an octane rating of only 73 and 75, respectively. Although increasing the octane rating of a $C_6$ fraction from the vicinity of about 26, which is the octane of normal hexane to about 70–75 by isomerization to produce isohexanes represents a substantial increase, it is generally not a sufficient increase to produce high octane gasoline components for use in unleaded or lead-free gasolines.

The $C_6$ rich hydrocarbons also have been considered as feedstocks for catalytic reforming in order to reform the $C_6$ material into reasonably low volatility gasoline boiling range hydrocarbons in the 90+ octane range. However, the $C_6$ hydrocarbons have been found to make a relatively unattractive feedstock for catalytic reforming processes.

Butanes have a high octane rating, with normal butane having an octane rating of about 90 and isobutane having an octane rating of about 99. However, as indicated previously, only limited amounts of butanes can be used in motor gasolines before exceeding Reid Vapor Pressure limitations for the gasoline.

Thus, it is desirable to provide a process for upgrading $C_6$ rich hydrocarbon fractions into 90+ octane rating components and it also is desirable to upgrade $C_4$ hydrocarbons into high octane gasoline boiling range hydrocarbons which are not as volatile as the $C_4$ hydrocarbons. The process of the present invention achieves these desired results by the combination of isomerization with averaging.

The averaging step is particularly advantageously employed with the isomerization step in the present invention as the averaging step serves to provide a normal pentane stream from the butane and hexane. The normal pentane stream is converted into isopentane in the isomerization zone. The isopentane has a relatively low Reid Vapor Pressure compared to butane and a very high motor octane rating compared to hexanes, particularly normal hexane.

As indicated in U.S. Pat. Nos. 2,951,888 and 3,472,912, minor amounts of sulfur compounds in the feed to isomerization processes are harmful for the typical isomerization processes. Catalysts used in typical isomerization processes included composites of a hydrogenating component on an amorphous acidic silica-alumina support and more usually composites comprising halogenated alumina or aluminum, either of which latter composites are herein referred to as halogenated aluminum catalysts.

According to U.S. Pat. 2,951,888, a $C_4$–$C_7$ paraffinic feedstock is desulfurized to a sulfur content less than 1 p.p.m. so that better results are achieved in hydroisomerization of the paraffinic feedstock with a catalyst selected from the group consisting of nickel, nickel-molybdenum, and palladium, supported on an acidic silica-alumina support containing 50–90 percent silica, at a temperature of 650°–800° F., a pressure of 100–1,000 p.s.i.g., and hydrogen/hydrocarbon mole ratio 0.5–5.0.

U.S. Pat. 3,472,912 also discloses an overall combination process involving hydrotreating and isomerization wherein a nickel-molybdenum on alumina catalyst is used under hydrotreating conditions to remove sulfur from $C_4$–$C_7$ saturated hydrocarbons so that the hydrocarbons can be isomerized with increased life for the isomerization catalyst. Preferred isomerization catalysts according to the process of U.S. Pat. 3,472,912 are platinum alumina composites activated by the addition of carbon tetrachloride (thereby resulting in a catalyst which is herein classified as a catalyst containing halogenated aluminum).

Purification of the $C_6$ feedstock to the averaging zone is necessary so that impurities such as sulfur compounds are not converted to $H_2S$ with the consequent deactivation of the averaging zone catalyst. The $nC_5$-rich effluent stream from the averaging zone is a very excellent feedstock for isomerization using a wide variety of isomerization catalysts in addition to the more recently developed crystalline aluminosilicate catalysts. Thus, although the crystalline aluminosilicate catalysts as described in more detail hereinbelow are particularly preferred for use in the isomerization reaction zone in the process of the present invention, a number of other catalysts can also be used very advantageously in the isomerization zone of the present invention even though they might be sensitive to small amounts of impurities such as sulfur compounds.

We have found many of the crystalline aluminosilicate catalysts to be relatively insensitive to minor amounts of sulfur impurities up to about 100 p.p.m. sulfur. However, the commonly used halogenated aluminum type isomerization catalysts are sensitive to sulfur impurities. The sulfur sensitive halogenated aluminum type catalysts can be used for isomerization in the process combination of the present invention because the averaging step in the process of the present invention insures an essentially sulfur-free feed for the isomerization zone.

Halogenated aluminum type catalysts which are sensitive to sulfur poisons but which can be used advantageously in the isomerization zone of the process of the present invention because of the high purity of the normal pentane derived from averaging step include the catalysts such as used in the Butamer Process described in the Oil and Gas Journal, Vol. 56, No. 13, Mar. 31, 1958, pp. 73–76, the BP isomerization process as described in Hydrocarbon Processing, Vol. 45, No. 8, August 1966, pp. 168–170, and the liquid phase isomerization process described in Hydrocarbon Processing, Vol. 42, No. 7, July 1963, pp. 125–130.

Thus, it is apparent that the process of the present invention allows for the use of a wide variety of isomerization catalysts in the isomerization zone with an expected very long life for the isomerization zone catalyst because of the high degree of purity of the normal pentane feedstock derived from the averaging step preceding the isomerization zone.

In the process of the present invention, it is particularly preferred to further integrate the averaging zone in the isomerization zone using common fractionation facilities to a substantial extent. Preferably, the effluent from both the $nC_5$ rich effluent from the averaging zone and the isomerization zone effluent containing $iC_5$ and $nC_5$ are fed to the same distillation column and fractionated therein to obtain an $iC_5$ product stream and a normal pentane rich stream which is fed to the isomerization zone.

In accordance with another preferred embodiment of the process of the present invention, the isomerization zone and the averaging zone are still further integrated by feeding a portion of the $C_6+$ hydrocarbons from the averaging zone to the isomerization zone along with the $nC_5$ fed to the isomerization zone and isomerizing at least a portion of the $C_6+$ hydrocarbons to branched chain saturated hydrocarbons and then recycling at least a portion of the branched chain $C_6+$ hydrocarbons to the averaging zone to increase the amount of isopentane produced directly in the averaging zone. Using the preferred dual function dehydrogenation-olefin averaging catalyst for the averaging zone, there is substantially no production (or depletion) of branched chain hydrocarbons in the averaging reaction zone. Thus, if normal hexane is fed to the averaging zone, the reaction of the normal hexane with normal butane will produce primarily normal pentane. However, if isohexane is fed to the averaging zone and reacted with normal butane, then a substantial amount of isopentane will result from the averaging of the isohexane with the normal butane. Thus, it is advantageous in the process of the present invention to convert a portion of the unreacted normal hexane from the averaging zone to isohexane so that more isopentane will be produced directly in the averaging zone by the averaging reaction between butane and isohexane. Furthermore, increased isopentane can be produced by reacting isoheptanes and isooctanes with butane as opposed to reacting normal heptane or normal octane with butane. Normal heptane and normal octane produced in the averaging zone from $C_4$ and $C_6$ interaction over the dual function dehydrogenation-olefin averaging catalyst can thus be ultimately converted to isopentane advantageously by isomerizing the normal heptane and normal octane and then returning branched chain heptane and branched chain octane to the averaging zone. Similarly, unreacted normal butane from the averaging zone is advantageously converted to isobutane in the isomerization zone so that isobutane can be recycled to the averaging zone to increase the production of isopentane in the averaging zone.

In broad scope, the process of the present invention can be applied to the averaging of various $C_6$ rich hydrocarbon streams with butane, but it is particularly preferred to feed a purified low sulfur content $C_6$ rich hydrocarbon stream to the averaging zone. A purified low sulfur content $C_6$ rich hydrocarbon stream which is a particularly advantageous feedstock for the averaging step in the process of the present invention is a $C_6$ rich cut from the effluent from a catalytic reforming process. The term "catalytic reforming" is used herein to refer to reforming processes wherein hydrocarbons, usually boiling in the naphtha range, are reformed by contacting the hydrocarbons with a reforming catalyst (e.g., a composite comprising platinum on alumina) at a temperature usually between about 700 and 1,000° F. The $C_6$ rich cut from catalytic reforming is essentially free of sulfur impurities. Other $C_6$ rich hydrocarbon fractions can be fed to the averaging zone but in those instances where appreciable sulfur impurities are present, a sulfur removal step such as hydrotreating must precede the averaging reaction step.

In the process of the present invention, various catalysts can be used in the averaging zone for the averaging reaction between hexanes and butanes to produce pentanes. However, it is greatly preferred to use catalyst compositions as described in application Ser. Nos. 864,870, now abandoned and 864,871. Thus, preferred catalysts are catalytic masses comprising a component which has catalytic activity for dehydrogenation, and a component which has catalytic activity for olefin averaging. Preferably, the catalytic mass comprises a platinum group metal or metal compound on a refractory support and a Group VI-B metal compound on a refractory support. The disclosures of Ser. Nos. 864,870, now abandoned and 864,871 are incorporated by reference into the present patent application, particularly those portions of the disclosure pertaining to dehydrogenation-olefin averaging catalyst compositions and preferred operating conditions using those catalysts. Preferred averaging zone reaction conditions for use in the process combination of the present invention which are discussed in more detail in Ser. No. 864,871 comprise contacting butanes and a paraffinic $C_6$ rich hydrocarbon fraction with a catalytic mass comprising platinum on alumina and tungsten or tungsten oxide on silica at a temperature between about 650° and 950° F. and a pressure between about 100 p.s.i.a. and 1500 p.s.i.a. Preferably, the olefin concentration in the averaging reaction zone is maintained below 5 volume percent.

As indicated previously, one of the particular advantages of the process of the present invention is that a wide variety of isomerization catalysts can be used in the isomerization zone but yet with long life and high activity for the isomerization catalyst due to the high purity of the normal pentane-rich feedstock derived from the averaging step in the process of the present invention. However, in the process of the present invention, crystalline aluminosilicate type catalysts are preferred as they can be used to obtain relatively high yields of isopentane and branched chain $C_6+$ paraffins at temperatures usually about 100° F. less than is required for a comparable isopentane yield using halogenated aluminum type isomerization catalysts.

Thus, catalysts comprising crystalline aluminosilicates such as molecular sieves, mordenite and layered crystalline aluminosilicates are preferred. It is preferred to use one or more hydrogenation components with the crystalline aluminosilicate. Palladium and platinum are preferred hydrogenation components. Preferred catalysts comprising crystalline aluminosilicate and a hydrogenation component such as palladium or others are described in patent applications Ser. Nos. 776,773, now abandoned, and 839,999, now U.S. Pat. No. 3,617,490 which applications are incorporated by reference into the present patent application, particularly those portions of the afore-identified applications disclosing catalyst compositions.

Preferred aluminosilicate-containing catalysts for use in the isomerization zone include catalysts comprising a layered clay-type aluminosilicate cracking component; with 0.01 to 2.0 weight percent, based on said cracking component and calculated as the metal, of a hydrogenating component selected from platinum, palladium, iridium, ruthenium, and rhodium; and also with 0.01 to 5.0 weight percent, based on said cracking component and calculated as the metal, of a hydrogenating component selected from tungsten and chromium. Particularly preferred hydroisomerization catalysts are those as described immediately above wherein the hydrogenating components are palladium and chromium.

In the present specification, oxides and other compounds of metals are to be considered as included in reference to a metal simply as an element, i.e., chromium includes the use of chromium in compound forms such as chromium oxide.

BRIEF DESCRIPTION OF THE DRAWING

The drawing is a schematic process flow diagram illustrating preferred embodiments of the present invention.

DETAILED DESCRIPTION

Referring now more particularly to the drawing, a $C_6$ rich hydrocarbon stream is fed via lines 1 and 2 to averaging zone 3. The $C_6$ hydrocarbons are averaged with butane fed via line 4 to the averaging zone to produce $C_5$ hydrocarbons in addition to other saturated hydrocarbons of higher and lower molecular weight. Preferably, the $C_6$ fraction or cut is obtained from the effluent from a catalytic reforming process. However, various other $C_6$ fractions can be processed in the process combination of the present invention, but the $C_6$ feed to the averaging zone should be substantially freed of sulfur compounds prior to reacting the hexanes with butanes in the averaging reaction zone. The main averaging reaction in zone 5 is:

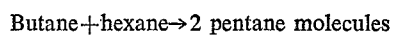

As indicated previously, the reaction preferably is carried out in the presence of a dehydrogenation-olefin averaging catalyst mass at a temperature preferably below 950° F.

Preferably, isohexane or other branched chain saturated hydrocarbons from the $C_6+$ group are recycled via lines 5 and 2 to the averaging zone. Increasing the amount of branched chain hydrocarbons to the averaging reaction zone increases the amount of $iC_5$ withdrawn in the effluent from the averaging zone via line 6 over what would be obtained in the case of a normal hexane-rich feed because an isohexane-rich feed produces more isopentane in the averaging reaction with butene than does a normal hexane feed. An important aspect of the process combination of the present invention is that the recycled isohexane or isoheptane or isooctane, etc., fed via line 5 to the averaging zone is obtained by the isomerization of unreacted hexane from the averaging zone or the isomerization of normal heptane or normal octane, etc., produced in the averaging zone due to the reaction between butanes and hexanes in the averaging zone. Thus, the process of the present invention can be advantageously very tightly integrated in the production of isopentane from butanes and hexanes by combined averaging and isomerization.

Unreacted butanes from the averaging zone can be recycled to averaging zone 3 via line 7 after separating the butanes in fractionation zone 8 from the averaging zone effluent. As indicated in the drawing, the feed to the isomerization zone from fractionation zone 8 can contain normal butane in addition to the normal pentane feed. It is advantageous to feed normal butane to the isomerization zone 9 along with the normal pentane because isobutane produced in isomerization zone 9 can be separated from the isomerization zone effluent in fractionation zone 8 and recycled to the averaging zone to increase the amount of isopentane produced in the averaging zone compared to that which would be produced by recycling unreacted normal butane from the averaging zone directly back to the averaging zone.

Also, to provide a relatively large amount of isobutane in the fresh feed to the averaging zone, preferably the fresh feed butanes are derived from a hydrocracking unit as effluent butanes from hydrocracking contain more than an equilibrium amount of isobutane, usually about 9 parts isobutane to 1 part normal butane. Isobutane is formed due to the reaction mechanism in hydrocracking and does not have sufficient time to equilibrate with normal butane before the reaction products are withdrawn from the hydrocracking reaction zone and cooled to a lower temperature. As is the case with isohexane, the isobutane feed increases the amount of isopentane obtained in the averaging zone.

Exemplary conditions for butane-hexane averaging are essentially the same as the following conditions employed in the averaging of normal butane and normal octane.

Volume of catalyst in reactor: 9 cubic centimeters (cc.)
Catalyst: 2 cc. of 0.5 wt. percent Pt.; 0.5 wt. percent Re; and 0.5 wt. percent Li on $Al_2O_3$; and 7 cc. of 8.0 wt. percent $WO_3$ on $SiO_2$, for a total of 9 cc. of catalyst. Both types of catalyst particles were 28 to 60 Tyler-mesh size, and the catalyst particles were uniformly mixed together.

Operating conditions:
  Temperature: 800° F.
  Pressure: 900 p.s.i.g.
  Feed rate:
    3 cc./hour of normal butane
    6 cc./hour of normal octane The product as shown below in Table I was obtained after operating for one hour in accordance with the above operating conditions.

TABLE I

| Product [1]: | Weight percent |
|---|---|
| $C_2H_6$ | 1.10 |
| $C_3H_8$ | 6.26 |
| $C_4H_{10}$ | 20.60 |
| $C_5H_{12}$ | 9.95 |
| $C_6H_{14}$ | 9.72 |
| $C_7H_{16}$ | 9.24 |
| $C_8H_{18}$ | 21.75 |
| $C_9H_{20}$ | 6.87 |
| $C_{10}H_{22}$ | 5.00 |
| $C_{11}H_{24}$ | 3.52 |
| $C_{12}H_{26}$ | 2.60 |
| $C_{13}$ to $C_{16}$ | 2.89 |

[1] Before analysis, the product was hydrogenated over a platinum-silica catalyst so that all product components were measured as alkanes (approximately one weight percent olefins was present in the total product before hydrogenating).

The above results illustrate the averaging of saturated hydrocarbons (alkanes) to obtain intermediate molecular weight hydrocarbons. A yield of 28.91 weight percent intermediate ($C_5$, $C_6$ and $C_7$) hydrocarbons was obtained in nonrecycle operation at a temperature of 800° F.

Table II below compares results for four runs at varying n-octane to n-butane feed ratios. The operating conditions were the same as those set out above, except for the ratio of $n$-$C_8$ to $n$-$C_4$.

TABLE II

| Feed (vol. percent) | | Products (wt. percent) | | | Intermediate product (wt. percent) Total of $C_5$, $C_6$ and $C_7$ |
|---|---|---|---|---|---|
| $C_8$ | $C_4$ | $C_5$ | $C_6$ | $C_7$ | |
| 0 | 100 | 13 | 7 | 4 | 24 |
| 33 | 67 | 13 | 10.5 | 7.5 | 31 |
| 67 | 33 | 10 | 10.5 | 9.5 | 29 |
| 100 | 0 | 7 | 8 | 9 | 24 |

The results shown above in Table II illustrate that the $n$-$C_8$ and $n$-$C_4$ feed constituents interact to form intermediate products, i.e., $C_5$, $C_6$ and $C_7$'s. If the $n$-$C_8$, $n$-$C_4$ feed was simply disproportionated, a yield of about 24 weight percent $C_5$, $C_7$, $C_8$ intermediate product would be obtained. When 100% $n$-$C_4$ is fed and thus disproportionated) a yield of 24 weight percent $nC_5$, $C_6$, $C_7$ is obtained. But when a mixture of $nC_4$ and $nC_8$ is fed, a yield of about 29 to 31 wt. percent $C_5$, $C_6$, $C_7$ is obtained. The increase of about 25 weight percent $C_5$, $C_6$, $C_7$ when the mixture of $nC_4$ and $nC_8$ is fed illustrates that the $nC_4$ and $nC_8$ are interacting or undergoing averaging reactions, rather than simply or only being disproportionated.

Effluent from the averaging zone containing normal pentane and usually an appreciable amount of isopentane is passed via line 6 to fractionation zone 8 wherein product isopentane is separated and withdrawn via line 10.

Light hydrocarbons, usually propane and lighter, which are generated in the averaging zone or in the isomerization zone, are withdrawn from the fractionation zone via line 11. Butanes are withdrawn via line 7 and recycled to the averaging zone via line 4 for reaction with hexanes. Preferably, at least a portion of the butanes from the fractionation zone are isobutanes derived from the isomerization of unreacted normal butane removed from the averaging zone and isomerized along with normal pentane in isomerization zone 9.

The normal pentane feedstream to isomerization zone 9 can comprise primarily normal pentane but as indicated previously, it is particularly advantageous to isomerize normal butane along with the normal pentane. $C_6+$ paraffins can also be isomerized simultaneously with the isomerization of normal pentane in zone 9.

The normal pentane-rich hydrocarbon fraction is isomerized in zone 9 in the presence of hydrogen using a hydroisomerization catalyst which preferably comprises a crystalline aluminosilicate together with a hydrogenation component such as palladium or platinum. Preferred operating conditions for the $C_6$ isomerization include a hydrogen gas rate in the range of 1,000 to 5,000 s.c.f./b., preferably 1,500 to 2,000 s.c.f./b.; space velocities in the range of about 0.1 to 20 liquid volumes per hour per volume of catalyst, preferably 1.0 to 5.0 LHSV; temperatures in the range of about 200 to 800° F., preferably 250 to 750° F.; and pressures within the range of atmospheric to 3,000 p.s.i.g., preferably in the range of 500 to 800 p.s.i.g.

In isomerization zone 9, the normal pentane-rich feed is isomerized to an isopentane-rich effluent. The term "rich" is used in the present specification to mean a content of at least 10 percent of the specified component and generally 25 percent or more of the specified component. Frequently, the term "rich" is used herein in referring to streams that have 50 percent or more of the specified component.

The isohexane-rich effluent is withdrawn from zone 9 via line 13 and fed to fractionation zone 8 via line 6.

Preferably, fractionation zone 8 comprises several distillation columns which are used in common for both the averaging zone and the isomerization zone. As discussed above, the amount of isopentane produced in the averaging zone is considerably enhanced by recycling isoparaffins from the isomerization zone to the averaging zone and also by feeding isoparaffins, as for example, isobutane from a hydrocracking unit to the averaging zone. The isopentane produced in the averaging zone is advantageously separated from the averaging zone reaction effluent in the same distillation column which separates isopentane from the effluent from the isomerization reaction zone effluent.

Isohexane can be withdrawn as a separate stream from fractionation zone 8 via lines 14 and 15. The octane rating of isohexane ranges between 73 and 75 for 2-methylpentane and 3-methylpentane to about 93 and 94 to 2,2-dimethylbutane and 2,3-dimethylbutane, compared to an octane rating of only about 26 for normal hexane. Thus, in certain instances, it is economically preferable to withdraw isohexanes as a separate stream via line 15 and to recycle normal hexane to the averaging zone. Thus, normal hexane can be withdrawn as a separate stream from fractionation zone 8 via line 16 and recycled via line 5 and 2 to averaging zone 3. However, since there usually is not a large amount of the 90+ octane dimethylbutane isomers produced and because the dimethyl butane isomers, particularly 2,3-dimethylbutane, boil close to the 70+ octane methyl pentane isomers, it is usually preferred in the process of the present invention to recycle the hexanes, particularly the branched chain hexanes to the averaging zone for the production of isopentane and normal pentane. Thus, the isohexane is preferably recycled via lines 17, 5 and 2 to averaging zone 3 to increase the production of isopentane in the averaging zone.

In some instances, it is preferable to withdraw a separate stream of heavier hydrocarbons from zone 8 via lines 19 and 20 for use as a gasoline component. Thus, $C_7$ hydrocarbons can be withdrawn from fractionation zone 8 via lines 19 and 20. However, in most instances, it is more advantageous to simplify fractionation zone 9 so that there is substantially only one bottoms stream withdrawn from the fractionation zone which bottoms stream is a $C_6$ rich stream containing some $C_7+$ hydrocarbons. This $C_6+$ stream containing $C_6$ and $C_7$ hydrocarbons is advantageously recycled via line 18 to the averaging zone for the production of isopentane and normal pentane.

The fractionation zone can contain a number of different distillation or separation facilities. However, preferably the three basic units in the fractionation zone are a depropanizer distillation column from which a $C_3-$ fraction is withdrawn, a deisobutanizer from which isobutanes are preferably withdrawn for recycle to the averaging zone 5, and a deisopentanizer from which product isopentane is withdrawn as an overhead stream, normal pentane is withdrawn as a sidestream for recycle to the isomerization zone and a $C_6+$ stream is withdrawn for recycle to the averaging zone. Typically, these basic distillation columns operate sequentially with the bottoms from the depropanizer being the feed to the deisobutanizer and the bottoms from the deisobutanizer being the feed to the deisopentanizer. Preferably, a normal butane stream is withdrawn as a sidestream from the deisobutanizer and the normal butane is recycled to isomerization zone 2 for isomerization to isobutane to aid in increasing the isopentane content of the averaging zone effluent.

Although various embodiments of the invention have been described, it is to be understood that they are meant to be illustrative only and not limiting. Certain features may be changed without departing from the spirit or scope of the present invention. It is apparent that the present invention has broad application to the combination of isomerization of $C_6$ hydrocarbons in combination with the averaging of $C_4$ and $C_6$ hydrocarbons. Accordingly, the invention is not to be construed as limited to the specific embodiments or examples discussed but only as defined in the appended claims or substantial equivalents of the claims.

I claim:

1. A process for converting butane and hexane into isopentane which comprises:
   (a) reacting normal hexane with normal butane in an averaging zone at a temperature between 400° and 850° F. and a pressure between 100 p.s.i.a. and 1,500 p.s.i.a. and in the presence of less than 5 volume percent olefins to obtain components of intermediate molecular weight relative to the hexane and butane, wherein the reacting is carried out by contacting the hexane and butane hydrocarbons with a catalyst mass comprising a platinum group metal or metal compound on a refractory support and a Group VI–B metal compound on a refractory support to obtain a stream containing n-pentane, and
   (b) isomerizing at least a portion of the n-pentane produced in the averaging zone in an isomerization zone by contacting the n-pentane with an isomerization catalyst at a hydrogen partial pressure between 10 p.s.i.g. and 3,000 p.s.i.g. and a temperature between 100° F. and 900° F. to obtain an isopentane-rich stream containing at least 25 weight percent isopentane.

2. A process in accordance with claim 1 wherein at least a portion of the n-pentane-rich averaging effluent stream is fed to a distillation column and at least a portion of the isopentane-rich stream fro mthe isomerization zone is fed to the same distillation column and the aforesaid streams are fractionated in said distillation column to obtain an isopentane product and a normal pentane-rich stream which is fed to the isomerization zone.

3. A process in accordance with claim 1 wherein the hexane fed to the averaging zone is obtained from the effluent from a catalytic reforming process.

4. A process in accordance with claim 1 wherein the isomerization catalyst comprises palladium or platinum and a crystalline aluminosilicate material.

5. A process in accordance with claim 1 wherein the isomerization catalyst comprises .05 to 5.0 weight percent palladium and .05 to 5.0 weight percent chromium on a layered clay type crystalline aluminosilicate component.

6. A process in accordance with claim 1 wherein the averaging reaction comprises contacting the hexane and butane hydrocarbon feed with a catalytic mass comprising platinum on alumina and tungsten or tungsten oxide on silica at a temperature between about 650° F. and 950° F. and a pressure between about 100 p.s.i.a. and 1,500 p.s.i.a.

7. A process for converting butane and hexane into isopentane which comprises:
   (a) reacting normal hexane with normal butane in an averaging zone at a temperature between 400° and 850° F. and in the presence of less than 5 volume precent olefins to obtain components of intermediate molecular weight relative to the hexane and butane, wherein the reaction is carried out by contacting the hexane hydrocarbons and normal butane with a catalyst comprising a platinum group metal on a refractory support and a Group VI-B metal on a refractory support to obtain an n-pentane-rich averaging effluent stream containing at least 25 weight percent n-pentane, and (b) isomerizing at least a portion of the n-pentane produced in the averaging zone in an isomerization zone by contacting the n-pentane hydrocarbons with an isomerization catalyst at a hydrogen partial pressure between about 100 and 1,500 p.s.i.g. and a temperature between about 200 and 800° F. to obtain an iso-pentane-rich stream containing at least 25 weight percent isopentane.

8. A process in accordance with claim 7 wherein at least a portion of the n-pentane-rich averaging effluent stream is fed to a distillation column and at least a portion of the isopentane rich stream from the isomerization zone is fed to the same distillation column and the aforesaid streams are fractionated in said distillation column to obtain an isopentane product and a normal pentane-rich stream which is fed to the isomerization zone.

References Cited

UNITED STATES PATENTS

| | | | |
|---|---|---|---|
| 3,445,541 | 5/1969 | Heckelsberg et al. | 260—683 D |
| 3,409,682 | 11/1968 | Mitsche | 260—676 |
| 3,507,931 | 4/1970 | Morris et al. | 260—683.65 |
| 3,321,547 | 5/1967 | Banks | 260—683 D |
| 3,301,917 | 1/1967 | Wise | 260—683.65 |
| 3,516,925 | 6/1970 | Lawrence et al. | 208—111 |
| 2,951,888 | 9/1960 | Carr | 260—683.65 |
| 3,676,522 | 7/1912 | Sieg | 260—676 |

DELBERT E. GANTZ, Primary Examiner

J. M. NELSON, Assistant Examiner

U.S. Cl. X.R.

260—683.65

UNITED STATES PATENT OFFICE
CERTIFICATE OF CORRECTION

Patent No. 3,752,862     Dated August 14, 1973

Inventor(s) Robert P. Sieg

It is certified that error appears in the above-identified patent and that said Letters Patent are hereby corrected as shown below:

Column 6, line 3, after "p.s.i.a." insert -- as shown by the examples in Serial No. 864,871, a particularly preferred temperature range for the averaging reaction zone is below 850°F., for example, 400 to 850°F. --.

Signed and sealed this 26th day of November 1974.

(SEAL)
Attest:

McCOY M. GIBSON JR.
Attesting Officer

C. MARSHALL DANN
Commissioner of Patents